US011777878B1

(12) United States Patent
Thompson

(10) Patent No.: US 11,777,878 B1
(45) Date of Patent: Oct. 3, 2023

(54) MESSAGE ROUTING BASED ON UNAVAILABILITY

(71) Applicant: ADP, Inc., Roseland, NJ (US)

(72) Inventor: Isaac Jordan Thompson, Atlanta, GA (US)

(73) Assignee: ADP, INC., Roseland, NJ (US)

(*) Notice: Subject to any disclaimer, the term of this patent is extended or adjusted under 35 U.S.C. 154(b) by 0 days.

(21) Appl. No.: 17/656,301

(22) Filed: Mar. 24, 2022

(51) Int. Cl.
*H04L 51/043* (2022.01)
*H04L 51/56* (2022.01)
*H04L 51/046* (2022.01)

(52) U.S. Cl.
CPC .......... *H04L 51/043* (2013.01); *H04L 51/046* (2013.01); *H04L 51/56* (2022.05)

(58) Field of Classification Search
CPC ..... H04L 51/043; H04L 51/046; H04L 51/56; H04L 51/04; H04L 51/066; H04L 67/54
See application file for complete search history.

(56) References Cited

U.S. PATENT DOCUMENTS

| | | | |
|---|---|---|---|
| 2002/0087634 A1* | 7/2002 | Ogle | H04L 51/214 709/204 |
| 2004/0019695 A1* | 1/2004 | Fellenstein | H04L 51/23 709/239 |
| 2005/0071433 A1* | 3/2005 | Shah | H04L 51/04 709/207 |
| 2006/0025164 A1* | 2/2006 | Wang | H04M 7/0045 455/466 |
| 2009/0313336 A1* | 12/2009 | Haynes | G06Q 10/107 709/206 |
| 2010/0069095 A1* | 3/2010 | Yahav | H04L 51/066 455/466 |
| 2012/0226763 A1* | 9/2012 | Roskind | H04L 51/04 709/206 |
| 2015/0373515 A1* | 12/2015 | Appelman | H04W 4/12 709/206 |

* cited by examiner

*Primary Examiner* — Johnny B Aguiar
(74) *Attorney, Agent, or Firm* — Foley & Lardner LLP

(57) ABSTRACT

Asynchronous messaging on an instant messaging system is provided. The method comprises receiving an instant message from a send addressed to a recipient on the instant messaging system and determining a current user status of the recipient. Responsive to a determination the recipient is currently available, the instant messaging system sends the instant message to the recipient in real time. Responsive to a determination the recipient is currently unavailable, the instant messaging system, according to sender preferences, sends the instant message to the recipient via an alternative communication system or stores the instant message in a queue until triggered to send the instant message when the current user status of the recipient changes to available.

18 Claims, 7 Drawing Sheets

MESSAGE ROUTING BASED ON UNAVAILABILITY

BACKGROUND INFORMATION

1. Field

The present disclosure relates generally to instant messaging systems, and in particular, to asynchronous messaging in instances of unavailable recipients.

2. Background

Instant messaging services have well instantiated constructs from the early 2000s regarding sending messages and indicating user status. Some instant messaging (IM) services can even communicate if a message has been read or if the other party is typing a response in a high bandwidth connection to ensure that the sender is aware of the recipient's active response activity.

Therefore, it would be desirable to have a method and apparatus that take into account at least some of the issues discussed above, as well as other possible issues. For example, it would be desirable to have a method and apparatus that automate data management process.

SUMMARY

An illustrative embodiment provides a computer-implemented method for asynchronous messaging on an instant messaging system. The method comprises receiving an instant message from a send addressed to a recipient on the instant messaging system and determining a current user status of the recipient. Responsive to a determination the recipient is currently available, the instant messaging system sends the instant message to the recipient in real time. Responsive to a determination the recipient is currently unavailable, the instant messaging system, according to sender preferences, sends the instant message to the recipient via an alternative communication system or stores the instant message in a queue until triggered to send the instant message when the current user status of the recipient changes to available.

Another illustrative embodiment provides a system for asynchronous messaging on an instant messaging system. The system comprises a storage device configured to store program instructions and one or more processors operably connected to the storage device and configured to execute the program instructions to cause the system to: receive, from a sender, an instant message addressed to a recipient on the instant messaging system; determine a current user status of the recipient; responsive to a determination the recipient is currently available, send the instant message to the recipient in real time; and responsive to a determination the recipient is currently unavailable, according to sender preferences: send the instant message to the recipient via an alternative communication system; or store the instant message in a queue until triggered to send the instant message when the current user status of the recipient changes to available.

Another illustrative embodiment provides a computer program product for asynchronous messaging on an instant messaging system. The computer program product comprises a computer-readable storage medium having program instructions embodied thereon to perform the steps of: receiving, from a sender, an instant message addressed to a recipient on the instant messaging system; determining a current user status of the recipient; responsive to a determination the recipient is currently available, sending the instant message to the recipient in real time; and responsive to a determination the recipient is currently unavailable, according to sender preferences: sending the instant message to the recipient via an alternative communication system; or storing the instant message in a queue until triggered to send the instant message when the current user status of the recipient changes to available.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that some instant messaging (IM) services can communicate if a message has been read or if the other party is typing a response in a high bandwidth connection to ensure that the sender is aware of the recipient's active response activity.

The illustrative embodiments also recognize and take into account that current instant messaging services do not have administrative set up or preferences to support synchronous to asynchronous messaging when a recipient is busy or otherwise unavailable to receive an instant message (e.g., Do not Disturb). Current instant messaging services do not have protected Do not Disturb (DnD) status as messages can still be sent and act as disturbances to the recipient.

The illustrative embodiments provide an instant messaging system that enables asynchronous messaging when recipients are unavailable. The asynchronous protocol of the illustrative embodiments allows an instant message to be stored in a queue and sent in an alternative manner via the user's preference and priority of message type at a later time triggered by a status change of the recipient or sent immediately via an alternative communication system such as email or SMS text. By providing true asynchronous messaging, the illustrative embodiments enforce the validity of a DnD status. At the same time, the sender does not risk losing the text message or train of thought and does not have to manually park the text in another software or clipboard solution because the instant messaging system itself can convert the rich text message to email or store the message until the presence servicer indicates the recipient's status as changed back to available/active.

Figure 1:
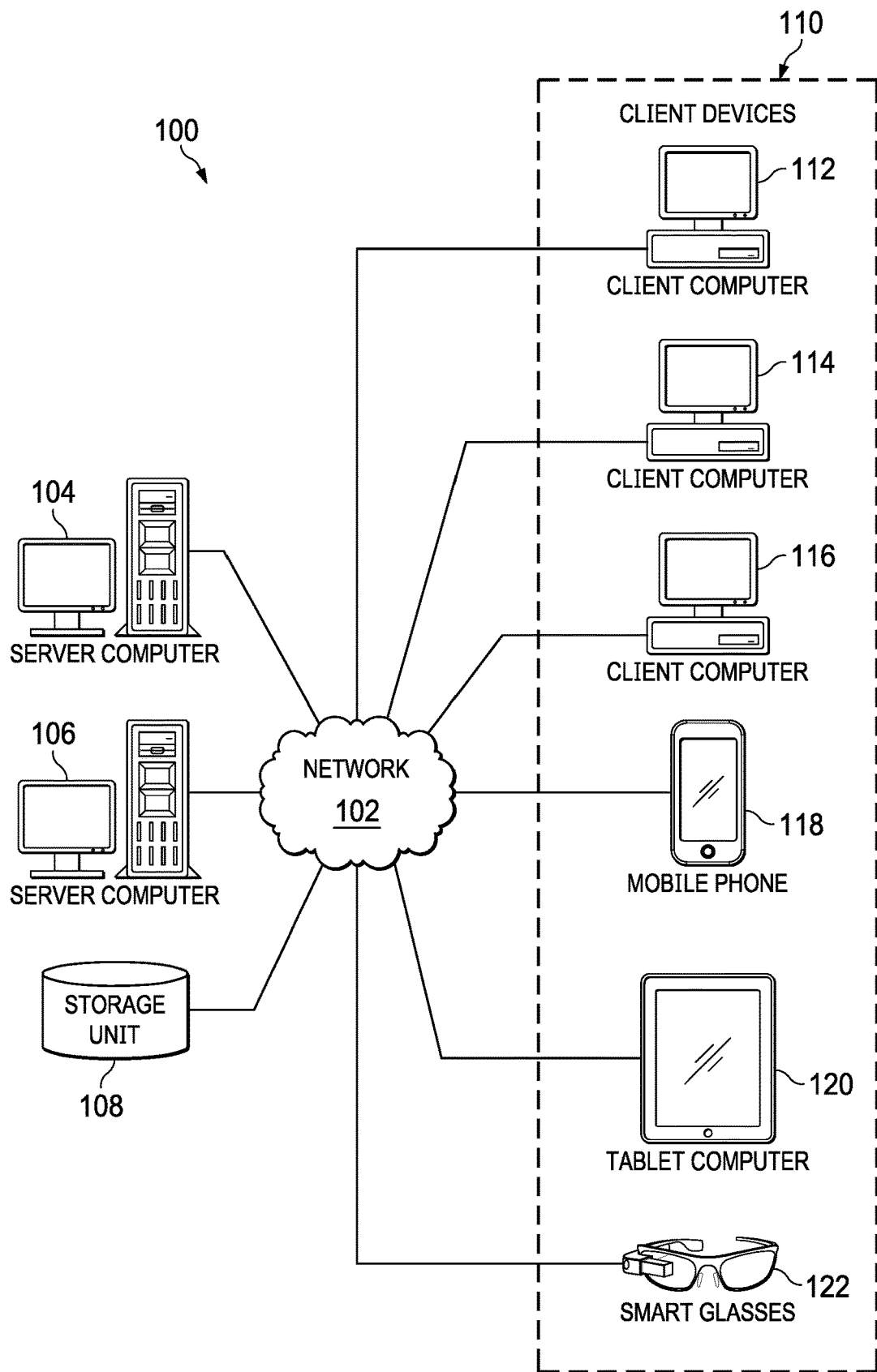
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative example, a "number of" when used with reference to items means one or more items. For example, a number of different types of networks is one or more different types of networks.

Figure 2:
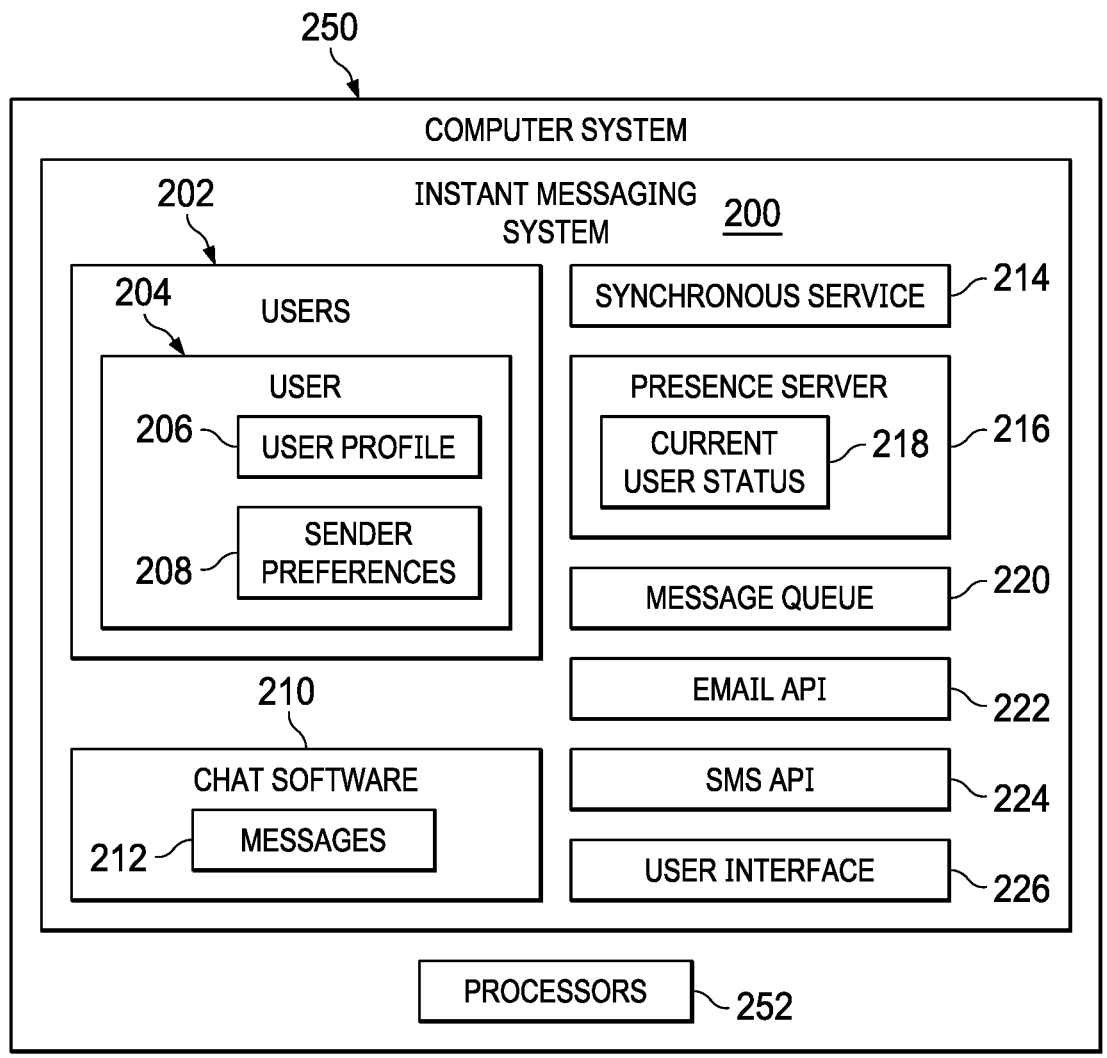
FIG. 2 depicts a block diagram illustrating an instant messaging system in accordance with an illustrative embodiment.

FIG. 2 depicts a block diagram illustrating an instant messaging system in accordance with an illustrative embodiment. Instant messaging system 200 may be implemented in network data processing system 100 shown in FIG. 1.

Instant messaging system 200 comprises a number of users 202 that communicate with each other via chat software 210. Each user 204 has an associated user profile 206 stored in instant messaging system 200 and sender preferences 208 that specify alternative methods of sending messages 212 when recipients are not immediately available.

The current user status 218 of users 202 is maintained by presence server 216. Synchronous service 214 continually pings presence server 216 to enable instant messaging system 200 to indicate the current user status 218 via user interface (UI) 226.

As users 202 attempt to exchange messages 212 through chat software 210, the current user status 218 indicated via UI 226 informs the sender as to whether the recipient in question is currently available to immediately receive the message in real time. The recipient may be currently unavailable for a number of reasons. For example, the recipient may a Do not Disturb (DnD) status indicated in the UI 226 and is therefore not receiving messages at the moment. As another example, the current user status 218 of the recipient may indicate that the recipient is sharing a screen with other viewers such as during a video conference, in which case it might be an unwelcome interruption to have an instant message or instant message notification pop up on the recipient's screen. An instant message may also include confidential information that the sender and/or recipient do not want inadvertently disclosed via such a shared screen. Other potential statuses may be used to indicate momentary unavailability of the recipient and tracked by presence server 216 and indicated via UI 226.

In instances where the current user status 218 indicates that the recipient is not available, instant messaging system 200 provides several alternatives for sending messages 212 without the need for a sender to manually copy and paste ("park") the text of the instant message into another software or clipboard solution (e.g., word processor document or notepad application) and send the message later. Which alternative communication method is used depends on the sender preferences 208 and their preferred priority set by the user 204.

One alternative method stores the instant message in a message queue 220 while the recipient is unavailable. A change in current user status 218 indicating recipient availability then automatically triggers the instant messaging system 200 to send the message. Another alternative method sends the instant message as an email to the recipient via email application programming interface (API) 222. If the recipient has a mobile telephone number stored in a user profile 206, the sender may also have the option of sending the instant message as a short message service (SMS) text message via SMS API 224.

Instant messaging system 200 can be implemented in software, hardware, firmware, or a combination thereof. When software is used, the operations performed by instant messaging system 200 can be implemented in program code configured to run on hardware, such as a processor unit. When firmware is used, the operations performed by instant messaging system 200 can be implemented in program code and data and stored in persistent memory to run on a processor unit. When hardware is employed, the hardware may include circuits that operate to perform the operations in instant messaging system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components for instant messaging system 200 can be located in computer system 250, which is a physical hardware system and includes one or more data processing systems. When more than one data processing system is present in computer system 250, those data processing systems are in communication with each other using a communications medium. The communications medium can be a network. The data processing systems can be selected from at least one of a computer, a server computer, a tablet computer, or some other suitable data processing system.

For example, instant messaging system 200 can run on one or more processors 252 in computer system 250. As used herein a processor is a hardware device and is comprised of hardware circuits such as those on an integrated circuit that respond and process instructions and program code that operate a computer. When processors 252 execute instructions for a process, one or more processors can be on the same computer or on different computers in computer system 250. In other words, the process can be distributed between processors 252 on the same or different computers in computer system 250. Further, one or more processors 252 can be of the same type or different type of processors 252. For example, one or more processors 252 can be selected from at least one of a single core processor, a dual-core processor, a multi-processor core, a general-purpose central processing unit (CPU), a graphics processing unit (GPU), a quantum processing unit (QPU), a digital signal processor (DSP), or some other type of processor.

Figure 3:
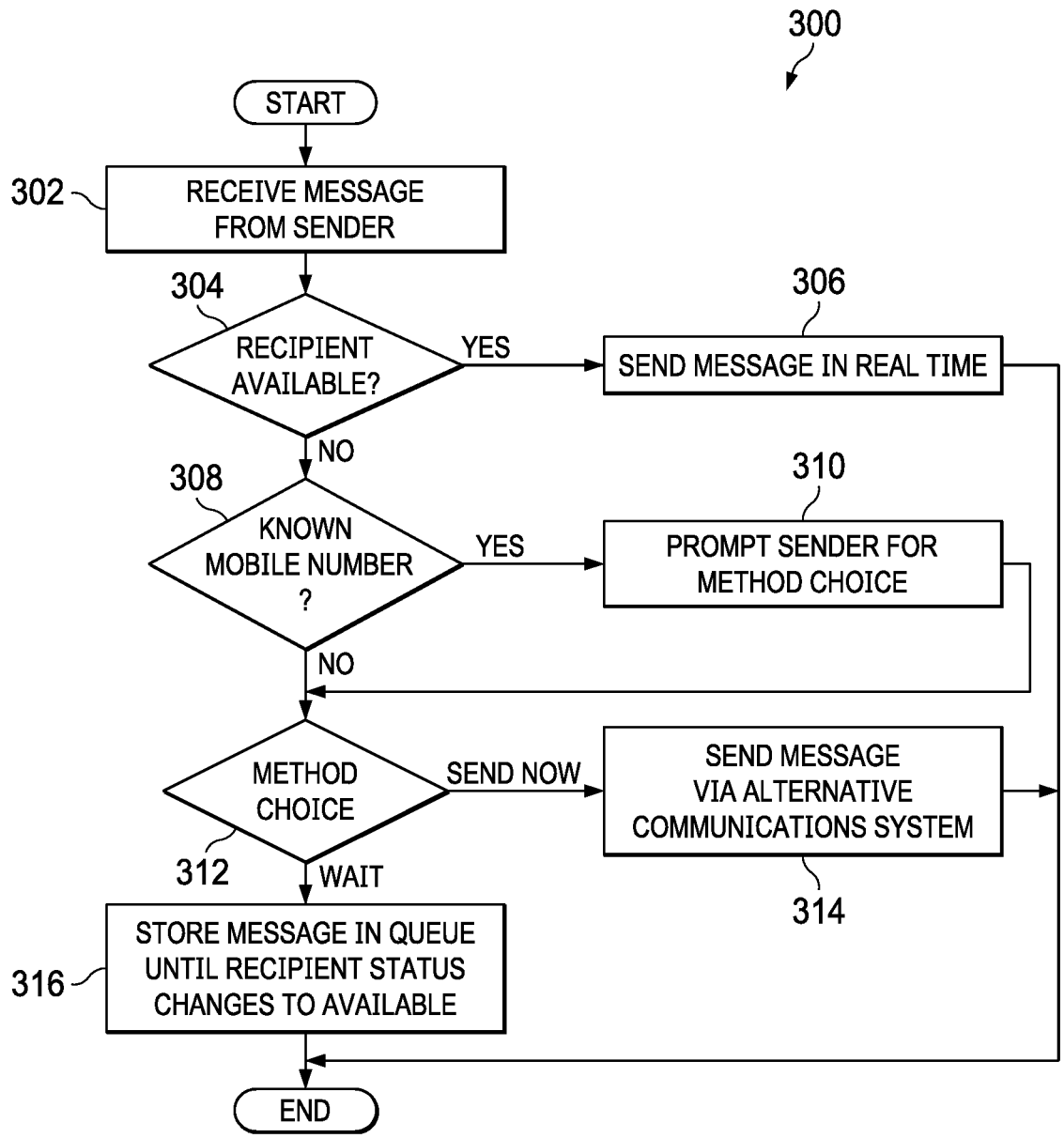
FIG. 3 depicts a flowchart illustrating a process for asynchronous messaging on an instant messaging system in accordance with illustrative embodiments.

FIG. 3 depicts a flowchart illustrating a process for asynchronous messaging on an instant messaging system in accordance with illustrative embodiments. Process 300 can be implemented in hardware, software, or both. When implemented in software, the process can take the form of program code that is run by one of more processor units located in one or more hardware devices in one or more computer systems. Process 300 may be implemented in instant messaging system 200 in FIG. 2.

Process 300 begins with the instant messaging system receiving, from a sender, an instant message addressed to a recipient on the instant messaging system (step 302). The instant messaging system determines a current user status of the recipient to ascertain if the recipient is currently available (step 304). Step 304 may entail a synchronous API call to the "status" server (e.g., presence server 216) and endpoint to retrieve the status of the recipient. This API call would be real time and resolve instantly in a functioning network.

The current user status may be provided by a presence server in the instant messaging system. A current user status of unavailable may be indicated by one of a DnD status or a Sharing Screen status.

Responsive to a determination the recipient is currently available, the instant messaging system sends the instant message to the recipient in real time (step 306). This message may be a synchronous API call to the instant messaging service as a message body (with rich text or possibly a file attachment such as a .jpg or .doc file) via the standard application handling or via an IM system to IM system endpoint (e.g., Cisco Webex® to iMessage® or MSFT Teams®). This API call would be real time and resolve instantly in a functioning network with a response from the end point of a successful receipt.

Responsive to a determination the recipient is currently unavailable (see FIG. 4), the instant messaging system may further determine the sender's preference of priority (either SMS/text, email, or send later) and, if SMS is preference 1, whether a mobile telephone number for the recipient is stored in a user profile in the instant messaging system (step 308). This determination may be an application check of the other user's profile settings or alternatively a synchronous API call to another instant messaging service's endpoint to retrieve the profile settings of the recipient. This API call would be real time and resolve instantly in a functioning network. The response in this scenario would be a profile setting of a blank or a populated mobile telephone number field and an authorization to allow SMS messaging.

Responsive to a determination that a mobile telephone number for the recipient is stored in a user profile in the instant messaging system, the instant messaging system prompts the sender to choose among alternate methods (via a dialog box or via the priority ranking of options) to send the instant message when the recipient is currently unavailable (see FIG. 5) (step 310). Sending the SMS message may comprise a synchronous API call to the SMS handling server via a SMS message endpoint to send the message to the recipient. This API call would be real time and resolve instantly in a functioning network. The SMS server should handle the message via the SMS Cellular network and respond back with a success message.

If there is no mobile telephone number for the recipient stored in a user profile, the instant messaging system determines a method choice for messaging the recipient selected by the sender (step 312). This method choice is specified by sender preferences and priority ranking (see FIG. 6), which may be preset by the sender or selected by the sender in response to a prompt in step 310. This determination may be an application check of the current user's profile settings to retrieve the profile settings and priority ranking of the sender. The system response in this scenario would be the profile setting of either email or "wait until later."

If the method choice in the send preferences and priority ranking is to send the message immediately without delay, the instant messaging system sends the message via an alternative communication system (step 314). This alternative messaging system may comprise email or an SMS text message (in the case where a recipient mobile telephone number is stored in a user profile). Email messaging may comprise an asynchronous API call to the email service as a message (with rich text or possibly a file attachment such as a .jpg or .doc file) via a standard email application handling. This API call to the email software would be real time and resolve instantly in a functioning network with a response from the end point of a successful receipt.

If the method choice is to wait until the recipient is available, the instant messaging system stores the instant message in a queue until triggered to send the instant message when the current user status of the recipient changes to available (step 316). This stored message may comprise a message (with rich text or possibly a file attachment such as a .jpg or .doc file) via the message handler as a later message once the instant messaging current user status of the recipient resets to "active" (i.e., available). Process 300 terminates thereafter.

Figure 4:
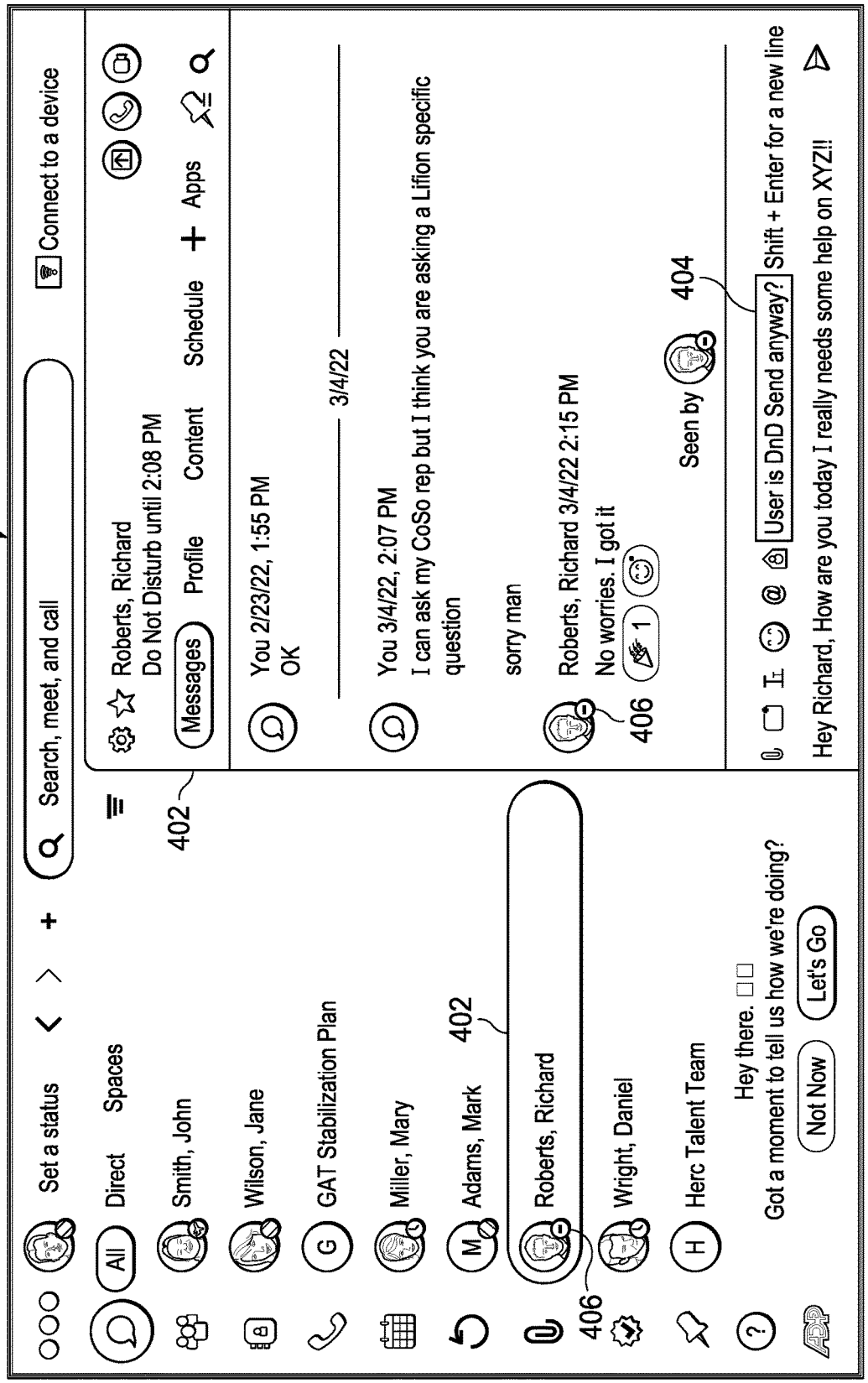
FIG. 4 depicts a diagram illustrating a user interface with a Do not Disturb notice for an instant messaging system in accordance with an illustrative embodiment.

FIG. 4 depicts a diagram illustrating a user interface with a Do not Disturb notice for an instant messaging system in accordance with an illustrative embodiment. In the present example, the sender has selected a recipient 402 in user interface 400. Recipient 402 has a DnD current user status, indicated by icon 406 adjacent the user's avatar, as well as by notice 404 at the bottom of the interface.

Figure 5:
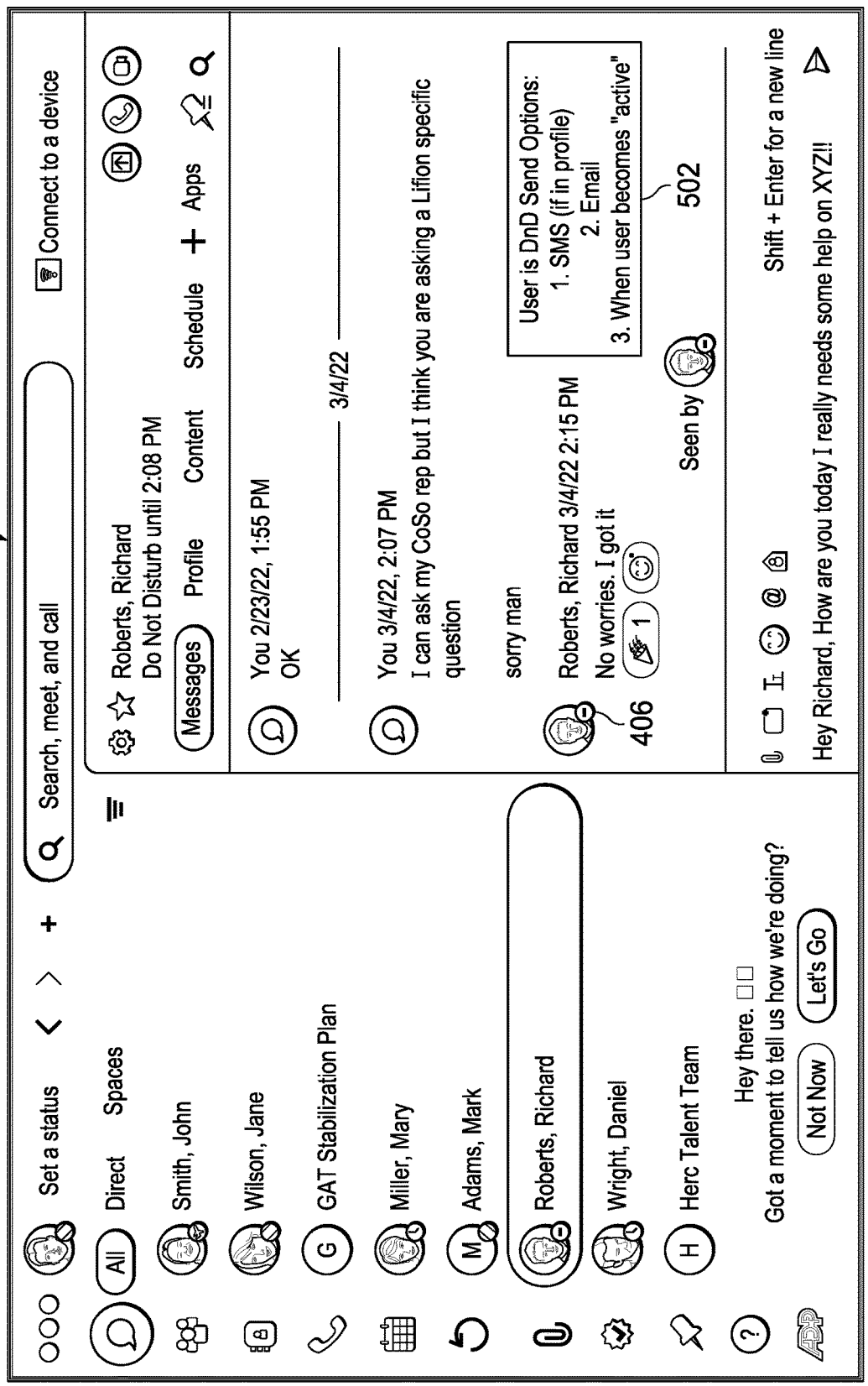
FIG. 5 depicts a diagram illustrating a user interface presenting a sender with messaging options in response to a Do not Disturb notice in accordance with an illustrative embodiment.

FIG. 5 depicts a diagram illustrating a user interface presenting a sender with messaging options in response to a Do not Disturb notice in accordance with an illustrative embodiment. In this example, in response to the send er clicking on the DnD notice set by the recipient, user interface 400 presents the sender with a real time interactive pop-up menu 502 of options for sending the message.

Figure 6:
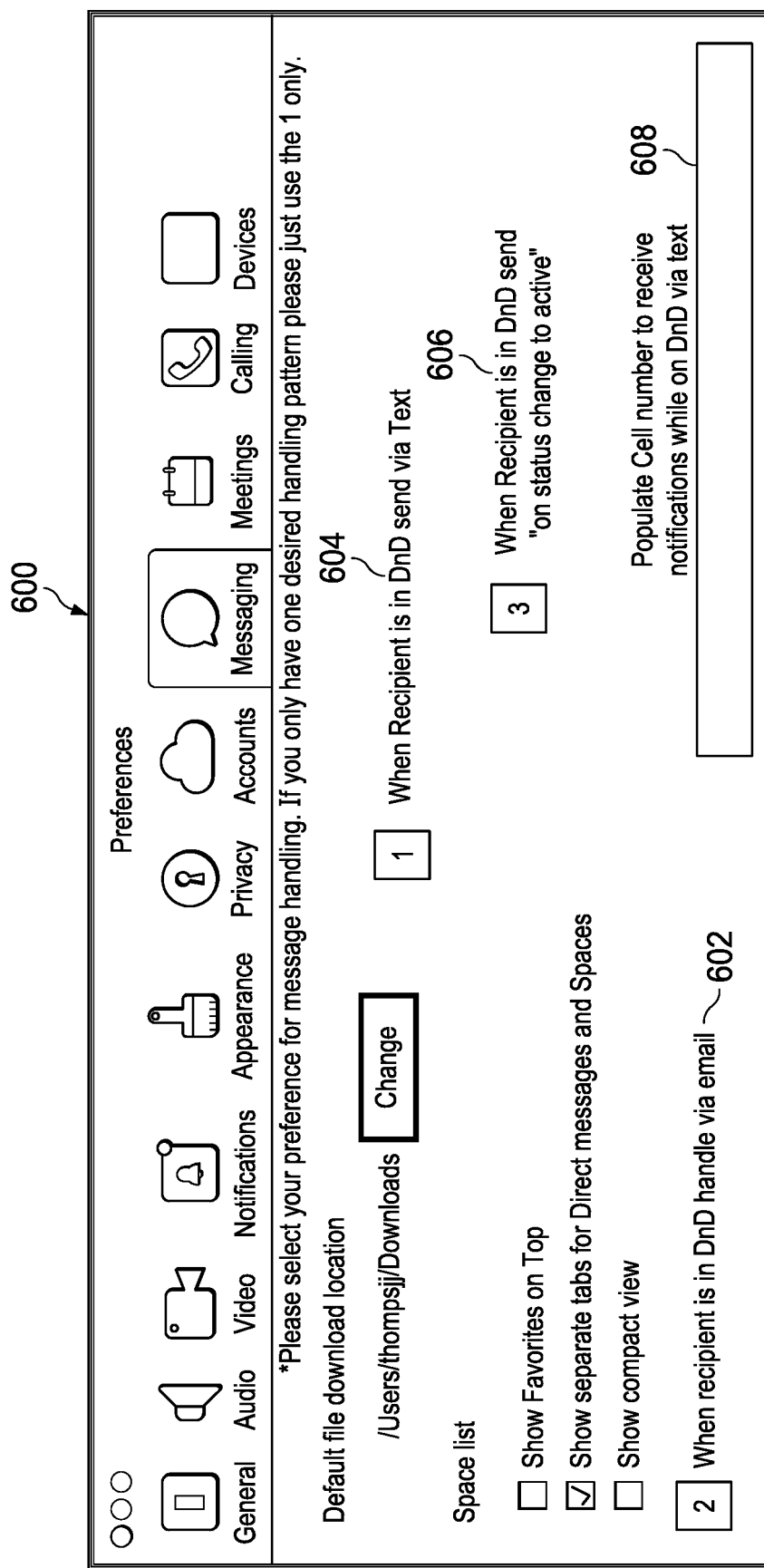
FIG. 6 depicts a diagram illustrating a user preferences and priority choice interface for an instant messaging system in accordance with an illustrative embodiment.

FIG. 6 depicts a diagram illustrating a user preferences interface for an instant messaging system in accordance with an illustrative embodiment. In this example, preferences interface 600 allows the user to select several options and a priority ranking of each for sending an instant message when a recipient is unavailable. User preferences interface 600 has options and the ability to denote preferred ranking preferences for sending via email 602, via SMS text 604, and delay until recipient is active again 606. In the present example, the user has selected SMS/text 604 as the priority 1 option, email 602 as the priority 2 option, and delayed 606 as priority 3. User preferences interface 600 also allows the user to provide a mobile telephone number in field 608 for receiving SMS text messages when the user sets a DnD status as a recipient.

Prioritized send options allow the instant messaging system of the illustrative embodiments to provide fallbacks in cases of API call failures. If an API call fails, and the other endpoint is not responding, the API does not have to continually retry the call but can instead switch to the next highest ranked send option. Using the example in FIG. 6, the sender has selected SMS 604 as the priority 1 send option, but no mobile telephone number is stored in the profile of the recipient in question. Therefore, the instant messaging system falls back to email 602 as the priority 2 option. If there is a problem with email service, such as an interruption of service with the email server, the instant messaging system would then fall back on placing the message into a queue to send later when the recipient user status changes back to available.

Figure 7:
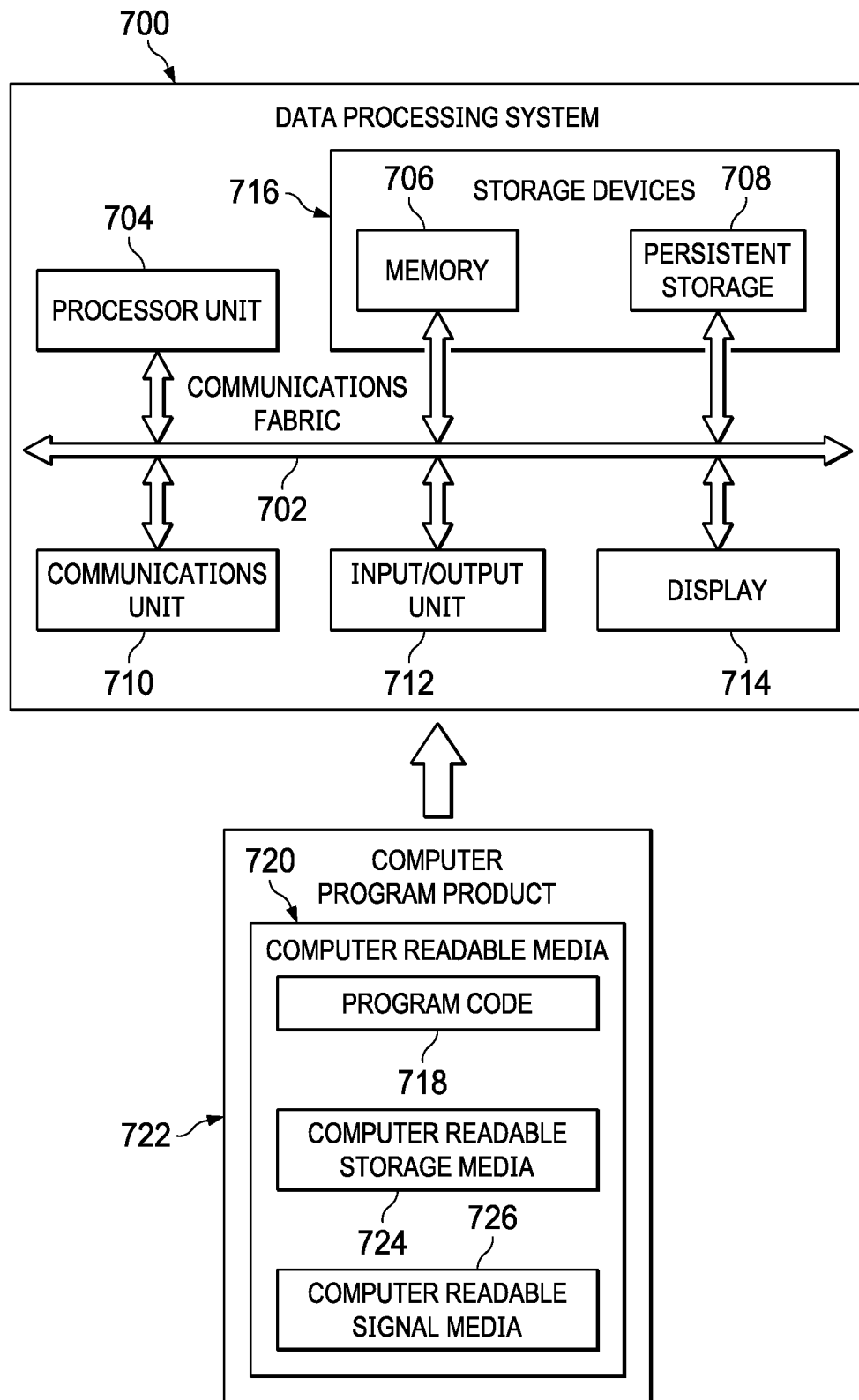
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement one or more computers and client devices 110 and servers computer 104, 106 in FIG. 1 and instant messaging system 200 in FIG. 2. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation. In an embodiment, processor unit 704 comprises one or more conventional general-purpose central processing units (CPUs). In an alternate embodiment, processor unit 704 comprises one or more graphical processing units (CPUs).

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708. Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718. Alternatively, program code 718 may be transferred to data processing system 700 using computer-readable signal media 726.

Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for asynchronous messaging on an instant messaging system, the method comprising:
   receiving, by a data processing system coupled with memory, from a sender, an instant message addressed to a recipient on the instant messaging system;
   determining, by the data processing system, a current user status of the recipient to be unavailable based on the recipient sharing a screen with one or more other computing devices;
   identifying, by the data processing system, that a telephone number is not associated with the recipient by querying a profile of the recipient;
   receiving, by the data processing system, responsive to identifying that the telephone number is not associated with the recipient, a selection from the sender to delay a transmittal of the instant message to the recipient;
   storing, by the data processing system, the instant message in a queue until triggered to send the instant message when the current user status of the recipient changes to available; and
   sending, by the data processing system, the instant message to the recipient responsive to the current user status of the recipient changing to available.

2. The method of claim 1, wherein the telephone number corresponds to short message service.

3. The method of claim 1, wherein responsive to identifying that the telephone number is not associated with the recipient, providing a prompt to the sender.

4. The method of claim 1, wherein the current user status of unavailable is indicated by one of:
   a Do Not Disturb status; or
   a Sharing Screen status.

5. The method of claim 1, wherein the current user status is provided by a presence server in the instant messaging system.

6. The method of claim 1, wherein a set of sender preferences are ranked by the sender.

7. A system for asynchronous messaging on an instant messaging system, the system comprising:

a storage device configured to store program instructions; and one or more processors operably connected to the storage device and configured to execute the program instructions to cause the system to:
  receive, from a sender, an instant message addressed to a recipient on the instant messaging system;
  determine a current user status of the recipient to be unavailable based on the recipient sharing a screen with one or more other computing devices;
  identify that a telephone is not associated with the recipient by querying a profile of the recipient;
  receive, responsive to identifying that the telephone number is not associated with the recipient, a selection from the sender to delay a transmittal of the instant message to the recipient;
  store the instant message in a queue until triggered to send the instant message when the current user status of the recipient changes to available; and
  send the instant message to the recipient responsive to the current user status of the recipient changing to available.

8. The system of claim 7, wherein the telephone number corresponds to short message service.

9. The system of claim 7, wherein responsive to identifying that the telephone number is not associated with the recipient, providing a prompt to the sender.

10. The system of claim 7, wherein the current user status of unavailable is indicated by one of:
  a Do Not Disturb status; or
  a Sharing Screen status.

11. The system of claim 7, wherein the current user status is provided by a presence server in the instant messaging system.

12. The system of claim 7, wherein a set of sender preference are ranked by the sender.

13. A computer program product for asynchronous messaging on an instant messaging system, the computer program product comprising:

a non-transitory computer-readable storage medium having program instructions embodied thereon the perform the steps of:
  receiving, from a sender, an instant message addressed to a recipient on the instant messaging system;
  determining a current user status of the recipient to be unavailable based on the recipient sharing a screen with one or more other computing devices;
  identifying that a telephone number is not associated with the recipient by querying a profile of the recipient;
  receiving, responsive to identifying that the telephone number is not associated with the recipient, a selection from the sender to delay a transmittal of the instant message to the recipient;
  storing the instant message in a queue until triggered to send the instant message when the current user status of the recipient changes to available; and
  sending the instant message to the recipient responsive to the current user status of the recipient changing to available.

14. The computer program product of claim 13, wherein the telephone number corresponds to short message service.

15. The computer program product of claim 13, wherein responsive to identifying that the telephone number is not associated with the recipient, providing a prompt to the sender.

16. The computer program product of claim 13, wherein the current user status of unavailable is indicated by one of:
  a Do Not Disturb status; or
  a Sharing Screen status.

17. The computer program product of claim 13, wherein the current user status is provided by a presence server in the instant messaging system.

18. The computer program product of claim 13, wherein a set of sender preferences are ranked by the sender.

* * * * *